United States Patent
Rodriguez et al.

(10) Patent No.: US 9,491,304 B2
(45) Date of Patent: *Nov. 8, 2016

(54) VOIP ANALOG TELEPHONE SYSTEM

(71) Applicant: NetTALK.com, Inc., Miami Gardens, FL (US)

(72) Inventors: Mark F. Rodriguez, North Miami, FL (US); Anastasios Takis Kyriakides, North Miami, FL (US); Kenneth Hosfeld, North Miami, FL (US); Leo Manzewitsch, North Miami, FL (US); Garry M. Paxinos, North Miami, FL (US); Nicholas Kyriakides, North Miami, FL (US)

(73) Assignee: NetTalk.com, Inc., North Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,945

(22) Filed: Jul. 27, 2015

(65) Prior Publication Data

US 2016/0191713 A1 Jun. 30, 2016

Related U.S. Application Data

(63) Continuation of application No. 13/584,750, filed on Aug. 13, 2012, now abandoned, which is a continuation-in-part of application No. 12/366,851, filed on Feb. 6, 2009, now Pat. No. 8,243,722.

(51) Int. Cl.
| | |
|---|---|
| *H04L 29/06* | (2006.01) |
| *H04L 12/66* | (2006.01) |
| *H04M 7/00* | (2006.01) |
| *H04M 1/253* | (2006.01) |
| *H04M 1/02* | (2006.01) |
| *H04M 1/738* | (2006.01) |
| *H04M 3/42* | (2006.01) |

(52) U.S. Cl.
CPC ...... *H04M 7/0069* (2013.01); *H04L 29/06387* (2013.01); *H04L 65/1059* (2013.01); *H04L 65/1069* (2013.01); *H04L 65/4007* (2013.01); *H04M 1/0289* (2013.01); *H04M 1/0293* (2013.01); *H04M 1/2535* (2013.01); *H04M 1/738* (2013.01); *H04M 3/42161* (2013.01); *H04M 2250/02* (2013.01)

(58) Field of Classification Search
None
See application file for complete search history.

(56) References Cited

U.S. PATENT DOCUMENTS

| | | | |
|---|---|---|---|
| 7,346,368 B2 | 3/2008 | Llanos | 455/550.1 |
| 7,372,851 B2 | 5/2008 | Boutboul | 370/356 |

(Continued)

OTHER PUBLICATIONS

"Installation, Configuration and Operation of Fritz!Box Fon Ata," Manual AVMGmbH, Jun. 2005, 87 Pages.

(Continued)

*Primary Examiner* — Candal Elpenord
(74) *Attorney, Agent, or Firm* — Niro McAndrews, LLC

(57) ABSTRACT

A multi-port VoIP telecommunications system that allows the user to gain access to telephone connectivity through the Internet by connecting directly to the Internet or by connecting to the Internet through the existing Internet connection of a computer or cell phone device. The present system includes an Ethernet port, a Wi-Fi receiver to facilitate the transmission and receipt of Internet protocol signals wirelessly, a USB plug connectable to the ATA, connectivity to a home monitoring network and connectivity to Bluetooth devices.

17 Claims, 8 Drawing Sheets

(56) References Cited

U.S. PATENT DOCUMENTS

| | | | |
|---|---|---|---|
| 7,463,615 B2 | 12/2008 | Vassilovski | 370/342 |
| 7,596,124 B2 | 9/2009 | Brenes | 370/338 |
| 7,706,355 B2* | 4/2010 | Michalewicz | H04L 29/06027 370/352 |
| 8,125,999 B2 | 2/2012 | Yasrebi | 370/401 |
| 8,190,148 B1* | 5/2012 | Ezrol | H04L 12/66 370/331 |
| 8,594,078 B2* | 11/2013 | Ying | H04L 12/5692 370/353 |
| 2002/0057682 A1 | 5/2002 | Hansen | 370/386 |
| 2004/0073820 A1 | 4/2004 | Hsu | 713/300 |
| 2004/0086093 A1* | 5/2004 | Schranz | H04L 12/1895 379/37 |
| 2004/0218583 A1 | 11/2004 | Adan | 370/352 |
| 2005/0105512 A1* | 5/2005 | Myhre | H04L 63/0853 370/352 |
| 2005/0243750 A1 | 11/2005 | Jurascheck | 370/312 |
| 2005/0271029 A1 | 12/2005 | Iffland | 370/348 |
| 2006/0077968 A1 | 4/2006 | Pitsoulakis | 370/352 |
| 2006/0092831 A1 | 5/2006 | Hartnett | 370/217 |
| 2006/0171378 A1 | 8/2006 | Harris | 370/352 |
| 2006/0187904 A1 | 8/2006 | Oouchi | 370/352 |
| 2006/0280132 A1 | 12/2006 | Connor | 370/276 |
| 2007/0002837 A1 | 1/2007 | Tan | 370/352 |
| 2007/0104085 A1 | 5/2007 | Sambhwani | 370/203 |
| 2007/0121604 A1* | 5/2007 | Chandra | H04L 29/06027 370/356 |
| 2007/0140262 A1 | 6/2007 | Wang | 370/395.52 |
| 2007/0189270 A1 | 8/2007 | Borislow | 370/352 |
| 2007/0189271 A1 | 8/2007 | Borislow | 370/352 |
| 2007/0286173 A1 | 12/2007 | Li | 370/356 |
| 2008/0031273 A1 | 2/2008 | Wang | 370/444 |
| 2008/0056245 A1 | 3/2008 | Boutboul | 370/356 |
| 2008/0112392 A1 | 5/2008 | Mansfield | 370/352 |
| 2008/0279177 A1* | 11/2008 | Shlomot | H04M 7/0069 370/352 |
| 2009/0154337 A1 | 6/2009 | Kim | 370/216 |
| 2009/0190583 A1 | 7/2009 | Accetta | 370/389 |
| 2009/0252054 A1 | 10/2009 | Barkan | 370/252 |
| 2009/0296625 A1 | 12/2009 | Wu | 370/315 |
| 2009/0323673 A1 | 12/2009 | Gabbay | 370/352 |
| 2010/0035650 A1 | 2/2010 | Gottehrer | 455/558 |
| 2010/0074190 A1 | 3/2010 | Cordeiro | 370/329 |

OTHER PUBLICATIONS

Ex Parte Reexamination 90/012,634 of U.S. Pat. No. 8,243,722—Request for Reexamination on Sep. 14, 2012, 43 pages.
Ex Parte Reexamination 90/012,634 of U.S. Pat. No. 8,243,722—Determiniation ordering Reexamination on Nov. 15, 2016, 22 pages.
Ex Parte Reexamination 90/012,634 of U.S. Pat. No. 8,243,722—Non-Final Action on Mar. 15, 2013, 13 pages.
Ex Parte Reexamination 90/012,634 of U.S. Pat. No. 8,243,722—Examiner Interview Summary Record on May 1, 2013. 4 pages.
Ex Parte Reexamination 90/012,634 of U.S. Pat. No. 8,243,722—Final Action on Aug. 15, 2013, 20 pages.
Ex Parte Reexamination 90/012,634 of U.S. Pat. No. 8,243,722—Advisory Action on Nov. 13, 2013, 4 pages.
Ex Parte Reexamination 90/012,634 of U.S. Pat. No. 8,243,722—Notice of Intent to Issue a Reexam Certificate on Dec. 19, 2013, 12 pages.
NetTalk.com, Inc. v. Magicjack LP, Magicjack holdings corporation, and Daniel Borislow, "Complaint for Patent Infringement," filed with the United States District Court for the Southern District of Florida West Palm Beach Division, case No. 9:12-CV-81022, filed Sep. 21, 2012, 11 pages.
NetTalk.com, Inc. v. Magicjack LP, Magicjack holdings corporation, and Daniel Borislow, "Defendants' Motion to Stay," filed with the United States District Court for the Southern District of Florida West Palm Beach Division, case No. 9:12-CV-81022, filed Nov. 8, 2012, 13 pages.
NetTalk.com, Inc. v. Magicjack LP, Magicjack holdings corporation, and Daniel Borislow, "Defendants' Motion to Dismiss," filed with the United States District Court for the Southern District of Florida West Palm Beach Division, case No. 9:12-CV-81022, filed Nov. 13, 2012, 21 pages.
NetTalk.com, Inc. v. Magicjack LP, Magicjack holdings corporation, and Daniel Borislow, "Response in Opposition to Defendants' Motion to Stay," filed with the United States District Court for the Southern District of Florida West Palm Beach Division, case No. 9:12-CV-81022, filed Nov. 26, 2012, 12 pages.
NetTalk.com, Inc. v. Magicjack LP, Magicjack holdings corporation, and Daniel Borislow, "Response in Opposition to Defendants' Motion to Dismiss," filed with the United States District Court for the Southern District of Florida West Palm Beach Division, case No. 9:12-CV-81022, filed Dec. 3, 2012, 17 pages.
NetTalk.com, Inc. v. Magicjack LP, Magicjack holdings corporation, and Daniel Borislow, "Reply to Response to Motion to Defendant's Motion to Stay," filed with the United States District Court for the Southern District of Florida West Palm Beach Division, case No. 9:12-CV-81022, filed Dec. 6, 2012, 12 pages.
NetTalk.com, Inc. v. Magicjack LP, Magicjack holdings corporation, and Daniel Borislow, "Reply to Response to Motion to Defendant's Motion to Dismiss," filed with the United States District Court for the Southern District of Florida West Palm Beach Division, case No. 9:12-CV-81022, filed Dec. 13, 2012, 13 pages.
NetTalk.com, Inc. v. Magicjack LP, Magicjack holdings corporation, and Daniel Borislow, "Amended Complaint," filed with the United States District Court for the Southern District of Florida West Palm Beach Division, case No. 9:12-CV-81022, filed Mar. 20, 2014, 16 pages.
NetTalk.com, Inc. v. Magicjack LP, Magicjack holdings corporation, and Daniel Borislow, "Plaintiff's Opening Claim Construction Brief," filed with the United States District Court for the Southern District of Florida West Palm Beach Division, case No. 9:12-CV-81022, filed Jun. 24, 2014, 20 pages.
NetTalk.com, Inc. v. Magicjack LP, Magicjack holdings corporation, and Daniel Borislow, "Defendants' Opposition to Plaintiff's Opening Claim Construction Brief," filed with the United States District Court for the Southern District of Florida West Palm Beach Division, case No. 9:12-CV-81022, filed Jul. 8, 2014, 27 pages.
NetTalk.com, Inc. v. Magicjack LP, Magicjack holdings corporation, and Daniel Borislow, "Answer to Amended Complaint," filed with the United States District Court for the Southern District of Florida West Palm Beach Division, case No. 9:12-CV-81022, filed Jul. 11, 2014, 23 pages.
NetTalk.com, Inc. v. Magicjack LP, Magicjack holdings corporation, and Daniel Borislow, "Plaintiff's Reply to Defendants' Opposition to Plaintiff's Opening Claim Construction Brief," filed with the United States District Court for the Southern District of Florida West Palm Beach Division, case No. 9:12-CV-81022, filed Jul. 16, 2014, 12 pages.
NetTalk.com, Inc. v. Magicjack LP, Magicjack holdings corporation, and Daniel Borislow, "Defendants' Sur-Reply in Support of their Opposition to Plaintiff's Opening Claim Construction Brief," filed with the United States District Court for the Southern District of Florida West Palm Beach Division, case No. 9:12-CV-81022, filed Jul. 29, 2014, 13 pages.
NetTalk.com, Inc. v. Magicjack LP, Magicjack holdings corporation, and Daniel Borislow, "Transcript of Markman Hearing held on Aug. 29, 2014 before Judge Darrin P. Gayles," filed with the United States District Court for the Southern District of Florida West Palm Beach Division, case No. 9:12-CV-81022, filed Sep. 11, 2014, 209 pages.
NetTalk.com, Inc. v. Magicjack LP, Magicjack holdings corporation, and Daniel Borislow, "Order on Claims Construction," filed with the United States District Court for the Southern District of Florida West Palm Beach Division, case No. 9:12-CV-81022, filed Dec. 1, 2014, 13 pages.
International Preliminary Report on Patentability for PCT Application PCT/US2010/022084 issued Aug. 9, 2011, 7 pages.
Written Opinion of the International Searching Authority for PCT Application PCT/US2010/022084 issued Mar. 8, 2010, 6 pages.
International Search Report for PCT Application PCT/US2010/022084 issued Jan. 26, 2010, 2 pages.

* cited by examiner

VOIP ANALOG TELEPHONE SYSTEM

CROSS-REFERENCE TO RELATED APPLICATION

This application is a continuation of U.S. patent application Ser. No. 13/584,750 filed on Aug. 13, 2012 as a continuation-in-part of U.S. patent application Ser. No. 12/366,851, filed by the same applicant an Feb. 6, 2009. This application claims the Feb. 6, 2009 filing date as to the common subject matter. All of which are incorporated by reference.

BACKGROUND OF THE INVENTION

1. Field of the Invention

This invention relates to a telecommunications system for personal phones or residential users that enables Voice over Internet Protocol (VoIP) telephony and facsimile services, and more specifically to a multi-port VoIP telephone system that allows the user to gain access to telephone connectivity through the Internet and utilize an analog telephone handset by transmitting through a device that is connected to the Internet by using an USB (Universal Serial Bus) port of a computer already connected to the internet or by connecting directly to the Internet via an RJ 45 port (or Ethernet port) or an existing Wi-Fi network or any other way to get connected to the Broadband Internet such as Wireless 3G (Third Generation) Services or Bluetooth (the short range wireless connectivity standard).

2. Description of Related Art

Land line telephone systems that include telephone handsets with wiring that goes through a publicly switched telephone network (PSTN) with a central office for switching are well known in the prior art. The basic technology behind how these systems are delivered has not changed much since its inception. Besides the fact that each individual phone set must be wired to be connected directly to each other individual handset during the telephone communication, the circuit is connected between both of the handsets and through the central office switchboard during the conversation.

Wireless telephony, which includes the use of wireless handsets and networks of cellular antennas, has increased immensely. This has allowed telephone users to connect to each other wirelessly from virtually any location that has access to a cellular network.

VoIP is a general term for a family of transmission technologies for delivery of voice communications over the Internet or other packet-switch networks. Other terms whose meaning is synonymous include IP telephony, Internet telephony, voice over broadband, broadband telephony, and broadband phone, all of which are used when network connectivity is available over broadband internet access. VoIP systems typically interface with traditional PSTN, allowing for transparent telephone communications world wide.

Typically, phones using a VoIP service can work from almost anywhere when connected to a computer that is accessing the Internet. However, some IP networks can be inherently unreliable and not provide a mechanism to ensure that data packets are delivered in sequential order. This can cause problems such as mitigating latency and jitter. Other problems can arise in channel routing VoIP traffic through firewalls and address translators.

In the last few years, VoIP services have begun to be marketed commercially. These services have become more feasible in large part because of the increased availability of broadband internet access. Subscribers to these VoIP services are able to make and receive calls as they would over a traditional PSTN. Full service VoIP phone companies provide inbound and outbound calling with direct inbound dialing.

In one VoIP scenario, an analog telephone adapter (ATA) is connected to and accesses the Internet through a computer with a broadband Internet connection and an existing telephone jack in order to provide service that is very similar to traditional PSTN. This service is typically offered by broadband internet service providers such as cable companies and telephone companies as a cheaper flat rate telephone service.

Another VoIP scenario involves using the signaling protocol Session Initiation Protocol (SIP). SIP is widely used for setting up and tearing down multimedia communication sessions such as voice and video calls over the internet. SIP can be used for creating, modifying, and terminating two party or multi-party sessions consisting of one or more media streams. A motivating goal for SIP was to provide a signaling and call set up protocol for IP based communications that can support a superset of the call processing functions and features present in the PSTN. It is designed to enable the construction of and various functionalities within network elements designated proxy servers and user agents that permit familiar telephone like operations such as dialing a number, causing a phone to ring, hearing ring back tones, or busy signal.

A primary limitation of existing VoIP systems is that they must use a computer in order to establish the requisite connection to the Internet.

What is needed is a VoIP analog telephone system for personal phones and residential users that allows the user to gain access to telephone connectivity by transmitting through the USB port of a computer or other device that is connected to the Internet or by connecting directly to the Internet via an RJ 45 port or an existing Wi-Fi network.

SUMMARY OF THE INVENTION

A multi-port VoIP analog telephone system for connecting personal phones and residential users that includes telephony and facsimile services comprising a conventional telephone or facsimile machine which includes a telephone jack and an ATA device that includes an RJ 45 port and at least one USB port and is connected to the telephone jack. The ATA device can be connected to a computer, a broadband modem through a RJ 45 port or a Wi-Fi router, allowing it to connect to the internet.

In its most basic setup, the system comprises the traditional analog telephone or facsimile machine connected to an ATA. The ATA is powered through its USB port either though a connection to a computer or through power adapter. The ATA can access the Internet directly through an RJ 45 port built in or indirectly by connecting through the ATA's USB port to a computer that is connected to the Internet or a device with access to the Internet through a cell phone network.

In a more advanced setup, the ATA hardware can be supplemented so that the ATA can access to the Internet wirelessly through a Wi-Fi network (or WiMax, or other standard wireless Internet networks) that is locally available or by a Bluetooth wireless connection to a computer already connected to the Internet.

The basic platform for the system includes a central processor, a storage medium, a memory source, a network interface card (NIC), a USB pot, an Internet input, a RJ 11 port (or any telephone port), and a reset switch which is included with an LED. The USB port can be used to input a power source, an Internet connection, or both. CODEC and SLIC circuitry is connected to the processor. The platform also includes an RJ 45 connector and RJ 11.

The user can gain access to telephone connectivity either through the USB port of any computer or cell phone like devices with Internet access, through an RJ 45 port connected to a switch, modem, or router without the need of a computer, or via a built-in Wi-Fi receiver without the need for a computer connection. The wireless connection through cell phone like devices can be through a GSN, EVDO, CODMA, and/or WIMAX network or other wireless networks.

The system also has an option for onboard dialers, ringtones, ring light, port inter phase for normal and/or Bluetooth auto input/output that completely eliminates the need for an external analog telephone device if the user so desires.

The ATA uses a SIP protocol hosted locally to provide the telephony functionality. The telephone system includes normal features such as call hold, call transfer with or without consultation, call waiting, three party conference, call forwarding, do not disturb, speed dial, repeat dial on busy, caller ID number and name, caller ID block, anonymous call rejection, configurable country tones, distinctive ring, hot line, call hunting between extension, speed dial of ten numbers and address, message wait indication, visual message waiting indication, configurable hook flash, adaptive jitter buffer, facsimile (transparent and facsimile relay), 411 information, and advanced voice security features such as RTP.

The system itself is plug-in-play and may have a CD that will help to install drivers on the computer connected to the Internet. The multi-port functional approach is also plug-in-play. The telephone functionality is auto configured and the ATA will take the user configuration from the network. The user sets the user account from a web page. The ATA can be identified by its MAC address and/or a serial number that can be electronically webbed.

It is an object of this invention to provide a VoIP analog telephone system that can be connected to the Internet either directly or indirectly, with the ability to use several means of connecting to establish telephone communications.

It is another object of this invention to provide a VoIP telephone system for personal telephone use that allows for connection to a computer through the USB port wherein the computer does not need an SIP application in order to allow clean computer sharing.

It is another object of this invention to provide a VoIP telephone system that provides unlimited calls to fixed phones throughout the United States, prepaid premium phone features, and VoIP service with any fixed phone, all while using an analog telephone headset.

In accordance with these and other objects which will become apparent hereinafter, the instant invention will now be described with particular reference to the accompanying drawings.

DETAILED DESCRIPTION

Figure 1:
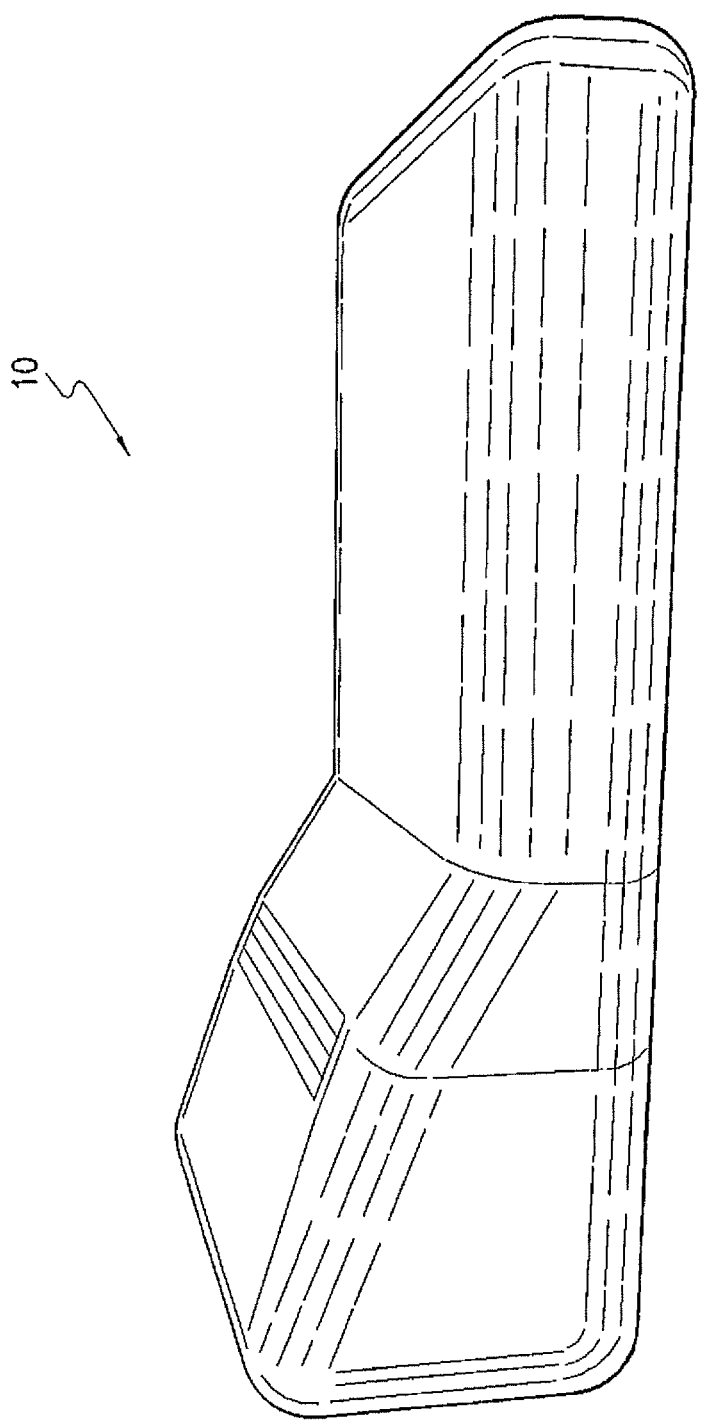
FIG. 1 shows a perspective view of the present invention.
Figure 2:
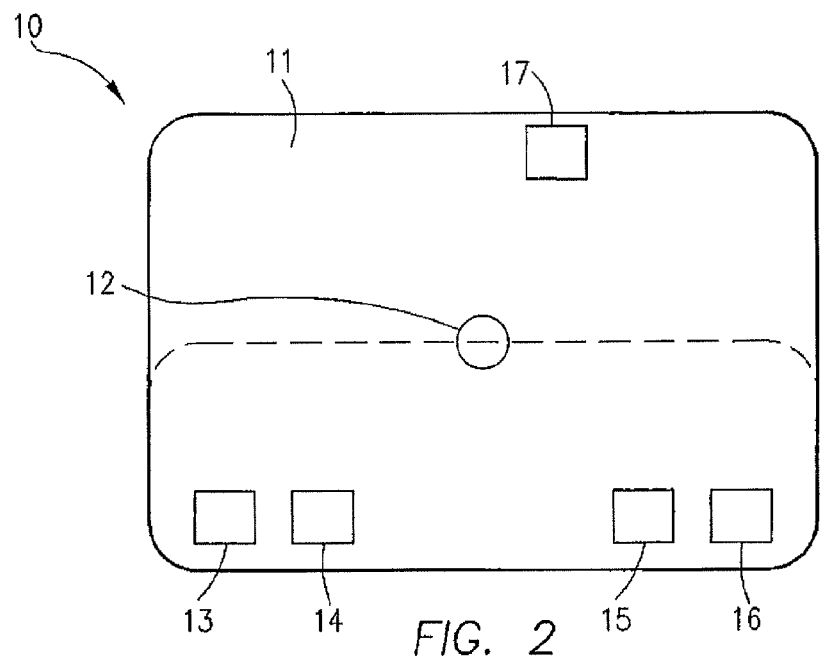
FIG. 2 shows a block diagram of the connections used in the present invention.
Figure 3:
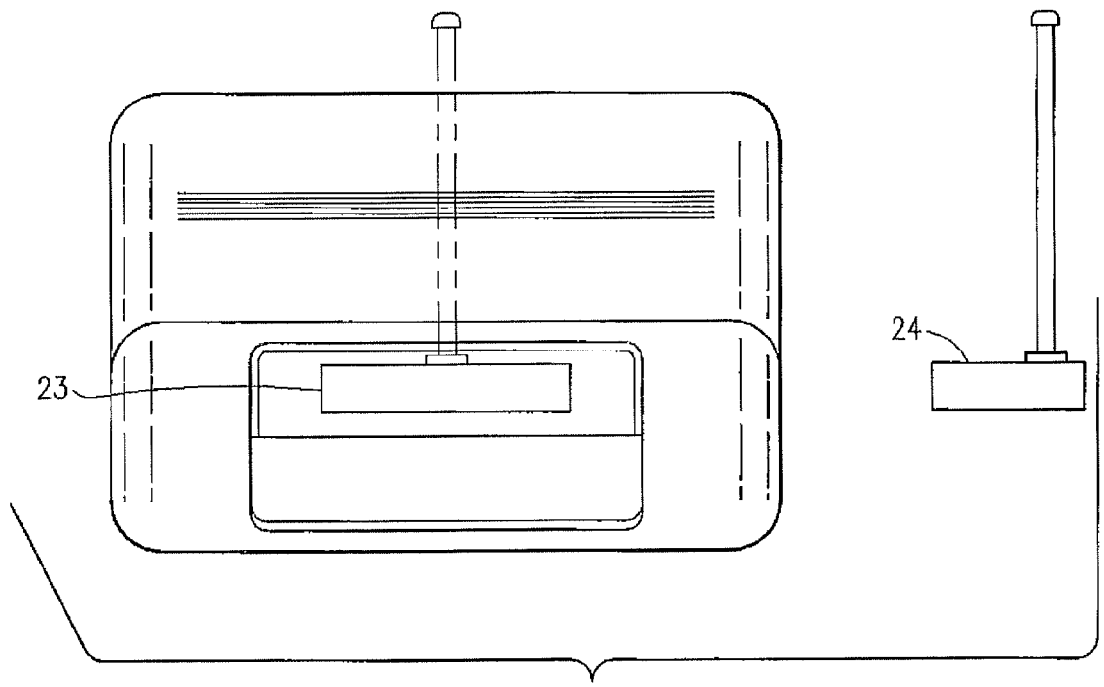
FIG. 3 shows a block diagram of the connections used in the present invention.

Referring now to the drawings and, in particular, FIGS. 1 through 3 the heart of the present invention is the ATA 10, which is a rigid device with a tall end 11 and a short end 20. The tall end 11 houses several of the ports that are needed to enable the numerous functions of the invention. An LED light 12 provides a visual display of the current power and operational state of the ATA 10. The reset button 17, when depressed by a user, shuts down and then immediately restarts the ATA 10. Two USB ports 13, 14 perform the function of providing data input/output as well as power input to the device. An Ethernet port 15 allows an Ethernet cord to be directly connected to the ATA 10 so that the invention can be used without a computer with Internet access. The telephone jack 16 is where the ATA 10 can receive a connection from an analog telephone handset.

The short end 20 of the invention contains a Wi-Fi adapter port 23. In order to enable the ATA 10 to employ a Wi-Fi Internet connection to utilize VoIP service, a Wi-Fi adapter 24 must be inserted into the Wi-Fi adapter port 23. When the Wi-Fi adapter 24 is fully engaged with the Wi-Fi adapter port 23, the ATA will search for available Wi-Fi networks and connect to an available Wi-Fi network.

Figure 4:
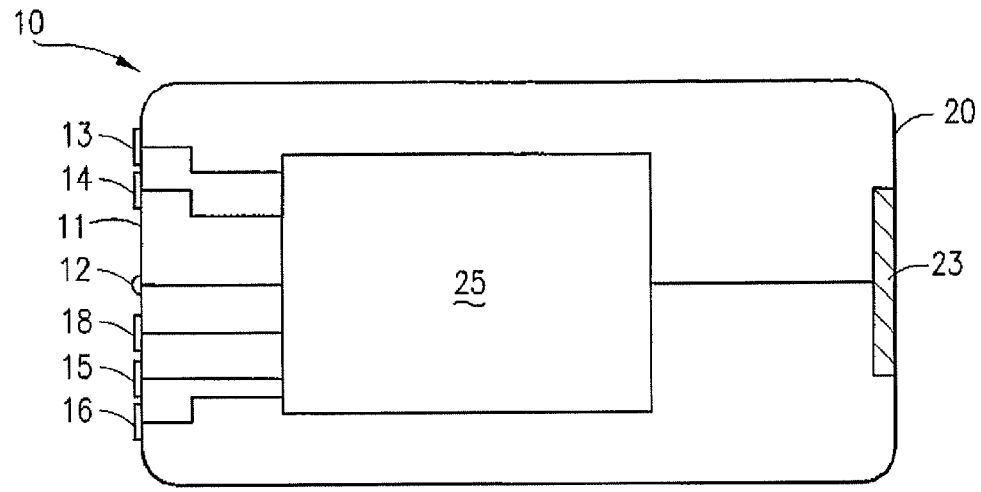
FIG. 4 shows a top plan view of the connections used in the present invention.

Referring now to FIG. 4, the control circuitry 25 in the ATA 10 contain several key components, all of which is mounted on to a platform. The heart of the circuitry components is the central processor 25. The ATA 10 also requires a random access memory component, a NIC component, and a storage medium component. In addition, the storage medium will contain the necessary software to perform the basic VoIP operations, including CODEC, SLIC, and SIP. Each of these components connect work through the processor and the various ports depending upon a particular input from the Internet and output to the Internet that will be achieved from the physical connection to an analog telephone handset.

Figure 5:
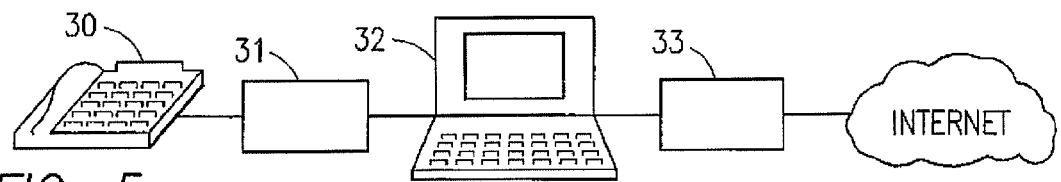
FIG. 5 shows a schematic diagram of the present invention using a USB connection to a computer.

Referring now to FIG. 5, the basic telephone VoIP system is shown that includes an analog telephone handset 30 as one would find in the conventional residence or even commercially. The analog telephone handset 30 is connected to the ATA 31 through the ATA's 31 telephone port (RJ 11 or compatible). The ATA 31 is shown connected to a computer 32 through a USB cord that is connected to the computer 32 and to the USB port on the ATA 31. The computer 32 is shown wired to a modem 33 (or router, modem/router combination device and/or a switch), which the computer is using to obtain access to the Internet. The ATA 31 receives power and accesses the Internet through the computer's 32 existing power supply and Internet access and is able to provide VoIP service through the computer's 32 Internet connection. When the VoIP system is configured in this way, a user is able to place and receive telephone calls nationwide without the analog telephone headset 30 being wired through a PSTN.

Figure 6:
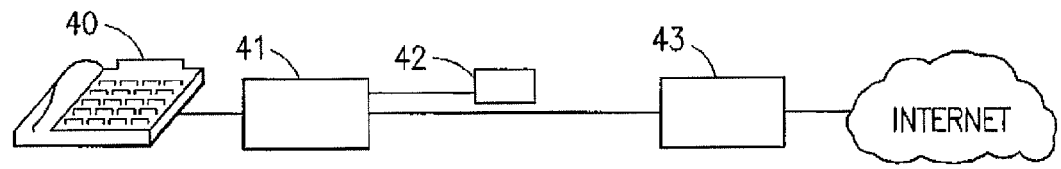
FIG. 6 shows a schematic diagram of the present invention using an Ethernet connection.

Referring now to FIG. 6, the VoIP system that does not require a computer is shown that includes a basic analog telephone handset 40. The analog telephone handset 40 is connected to the ATA 41 through the ATA's 41 telephone port (RJ 11 or compatible). The ATA 41 is shown connected to a USB electric plug adapter 42 through a USB cord that is plugged into one of the ATA's 41 USB ports. The USB electric plug adapter 42 allows the ATA 41 to receive electrical power without a computer connection. The ATA 41 is also shown connected directly to a modem 43 (or router, modem/router combination device and/or a switch) with an Ethernet cord (RJ 45 or compatible) plugged into its Ethernet port. This allows the ATA 41 to access the Internet through the modem 43 without a computer connection. The ATA 41 is able to utilize a direct connection to the Internet through the ATA's 41 NIC component, which is similar to the NIC component found in computers. The NIC component may be on a NIC card or may be on a mainboard or equivalent. When the VoIP system is configured in this way, a user is able to place and receive telephone calls nationwide without the analog telephone handset 40 being wired through a PSTN and even without a wired connection to a computer.

Figure 7:
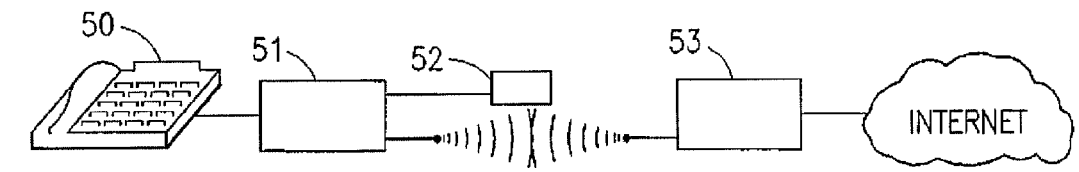
FIG. 7 shows a schematic diagram of the present invention using a Wi-Fi connection.

Referring now to FIG. 7, the VoIP system that does not require a computer is shown that includes a basic analog telephone handset 50. The analog telephone handset 50 is connected to the ATA 51 through the ATA's 51 telephone port (RJ 11 or compatible). The ATA 51 is shown connected to a USB electric plug adapter 52 through a USB cord that is plugged into one of the ATA's 51 USB ports. The USB electric plug adapter 52 allows the ATA 51 to receive electrical power without a computer connection. The ATA 51 is also shown exchanging wireless signals with a wireless router 53. This facilitates the ATA 51 to access the Internet wirelessly through the wireless router 53 without a computer connection or even a wired connection to a modem, router, modem/router combination device and/or a switch. The ATA 51 is able to connect to the wireless signal through the ATA's 51 Wi-Fi adapter and the ATA 51 utilizes the connection to the Internet through the ATA's 51 NIC component, which is similar to the NIC component found in computers. When the VoIP system is configured in this way, a user is able to place and receive telephone calls nationwide without the analog telephone handset 50 being wired through a PSTN and even without the a wired connection to a computer or a modem.

Figure 8:
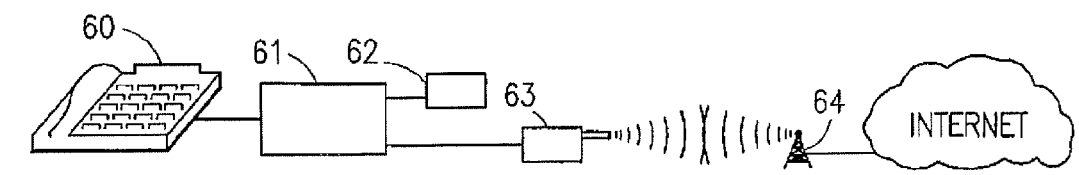
FIG. 8 shows a schematic diagram of the present invention using a USB connection to a cell phone.

Referring now to FIG. 8, the VoIP system that does not require a computer is shown that includes a basic analog telephone handset 60. The analog telephone handset 60 is connected to the ATA 61 through the ATA's 61 telephone port (RJ 11 or compatible). The ATA 61 is shown connected to a USB electric plug adapter 62 through a USB cord that is plugged into one of the ATA's 61 USB ports. The USB electric plug adapter 62 allows the ATA 61 to receive electrical power without a computer connection. The ATA 61 is also shown connected to a cell phone 63 through a USB cord that is plugged into one of the ATA's 61 USB ports. When configured in this manner, the ATA 61 can access the Internet through the cell phone's 63 Internet connection. Generally, it is through a cell phone's 63 connection to the cell phone tower 64, whether the connection is of a GSM, CDMA, or EVDO standard, that the cell phone is able to obtain access to the Internet. However, the ATA 61 can also access the Internet through the cell phone 63 if the cell phone is connecting to the Internet through an available Wi-Fi or WIMAX signal.

Either way, this configuration provides the most flexibility in terms of location and facilitates the ATA 61 to access the Internet wirelessly cell phone 63 without a computer connection, a wired connection to a modem, router, modem/router combination device and/or a switch, or even a nearby Wi-Fi signal. When the VoIP system is configured in this way, a user is able to place and receive telephone calls nationwide without the analog telephone handset 60 being wired through a PSTN and even without the a wired connection to a computer or a modem, or even a WLAN nearby.

Figure 9:
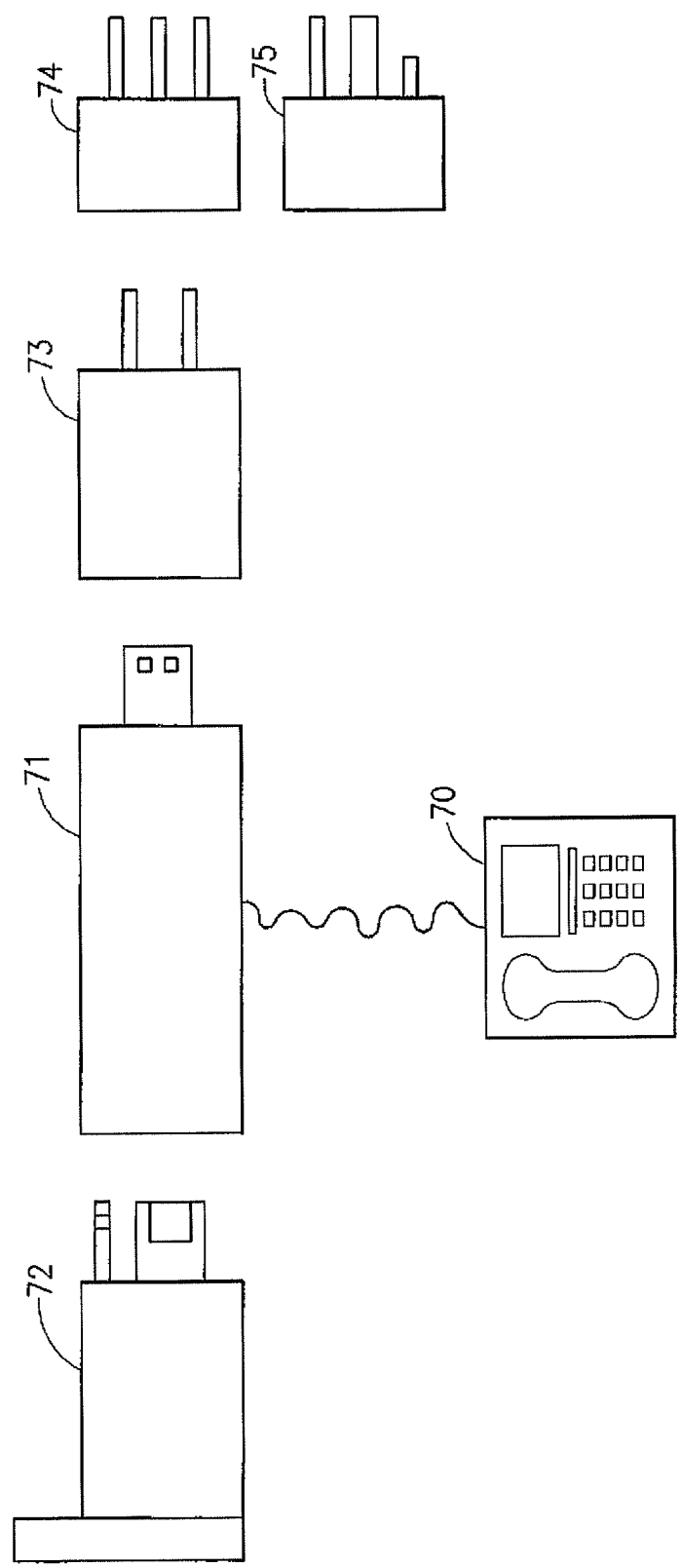
FIG. 9 shows a schematic exploded diagram of the present invention with power connector adapters and power adapters.

Referring now to FIG. 9 the system is shown set up to have the analog phone 70 connected to ATA 71 to include the WI-FI device 72 and a series of power adapters 73, 74, and 75 which are power connector adapters.

Figure 10:
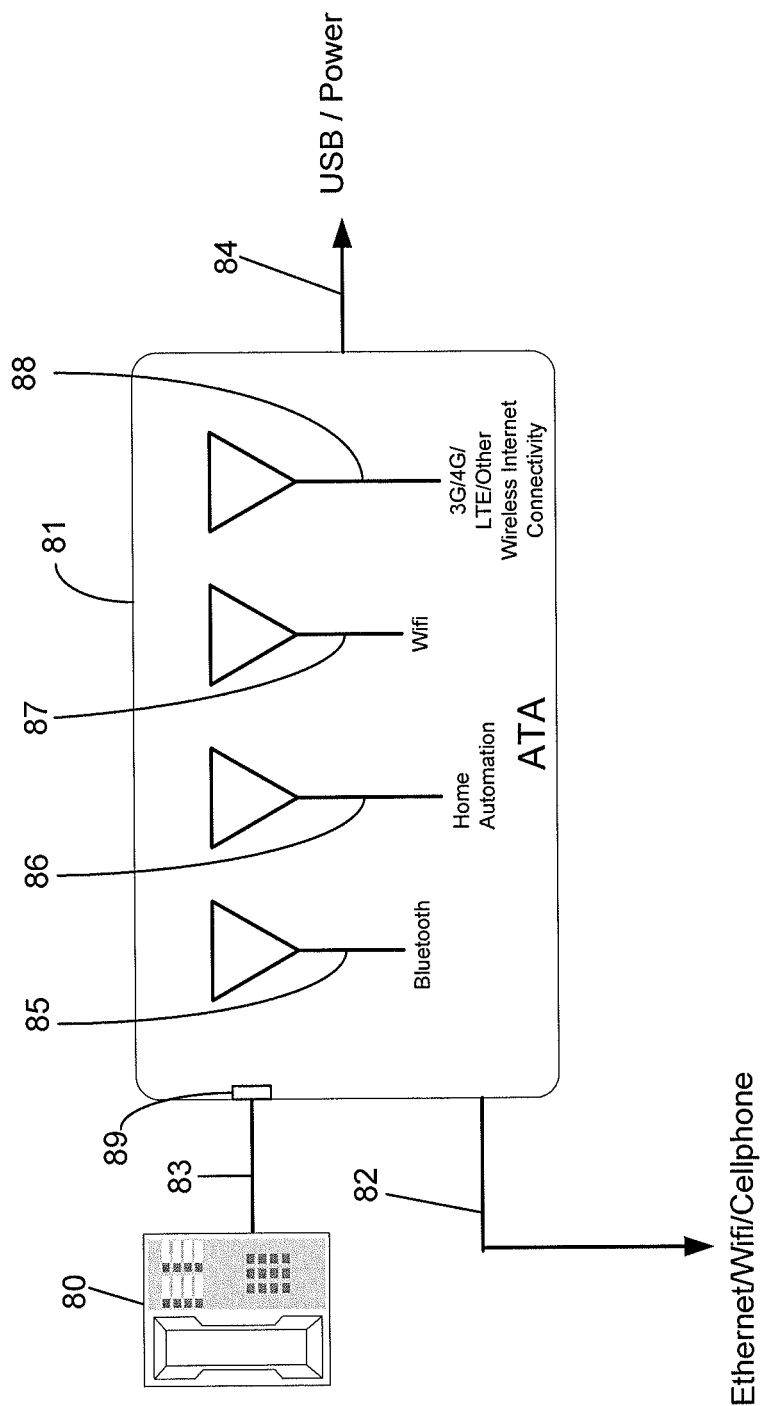
FIG. 10 shows a schematic diagram of an alternative embodiment of the analog telephone adapter of the present invention.

Referring now to FIG. 10, an embodiment of a VoIP system that includes an ATA and does not require a computer but can be used with a computer connected using the USB port 84 is shown that includes a basic analog telephone handset 80. An analog telephone handset 80 or computer may be connected to the ATA 81. The analog telephone handset 80 may be wired to the ATA 81 or connected through the ATA's 81 telephone port (RJ 11 or compatible) 89. The ATA 81 as shown may include an Ethernet connection 82, phone line connection 83, or both. In addition, the ATA includes a power source, and power may be provided via a connection 84 to a USB electric plug adapter through a USB cord that is plugged into one of the ATA's USB ports. A USB electric plug adapter allows the ATA 81 to receive electrical power without a computer connection. The ATA 81 also includes a variety of transceivers for communication via systems such as Bluetooth 85, a wireless home automation network 86, WiFi 87 or cellular telephone service, such as 3G, 4G, LTE or any other similar service known in the art. Thus, the ATA may act as a router or access point for transmitting and receiving signals via 3G, 4G, LTE, WiFi, WiMAX and/or any other known interface.

Figure 11:
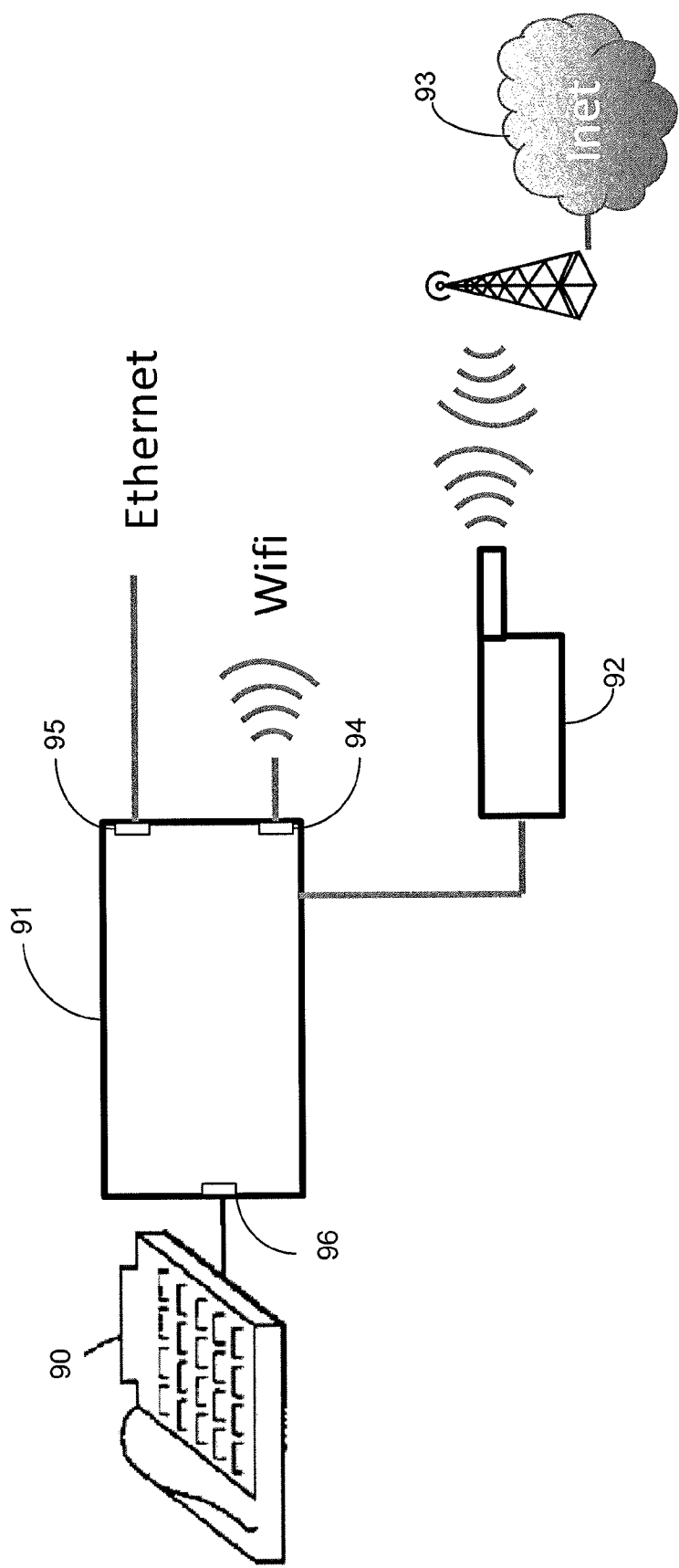
FIG. 11 shows a schematic diagram of the present invention having a plurality of internet connections.
Figure 12:
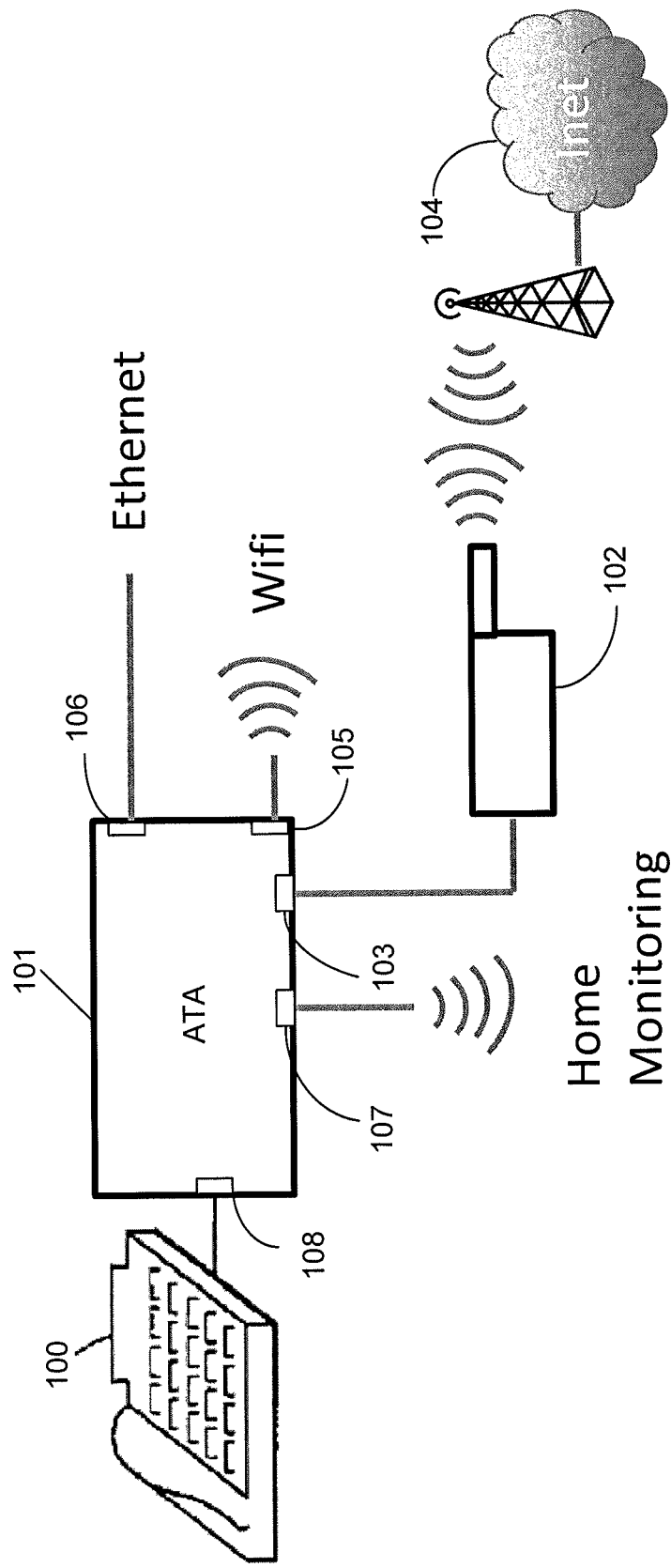
FIG. 12 shows a schematic diagram of the present invention having connectivity with a home monitoring system.
Figure 13:
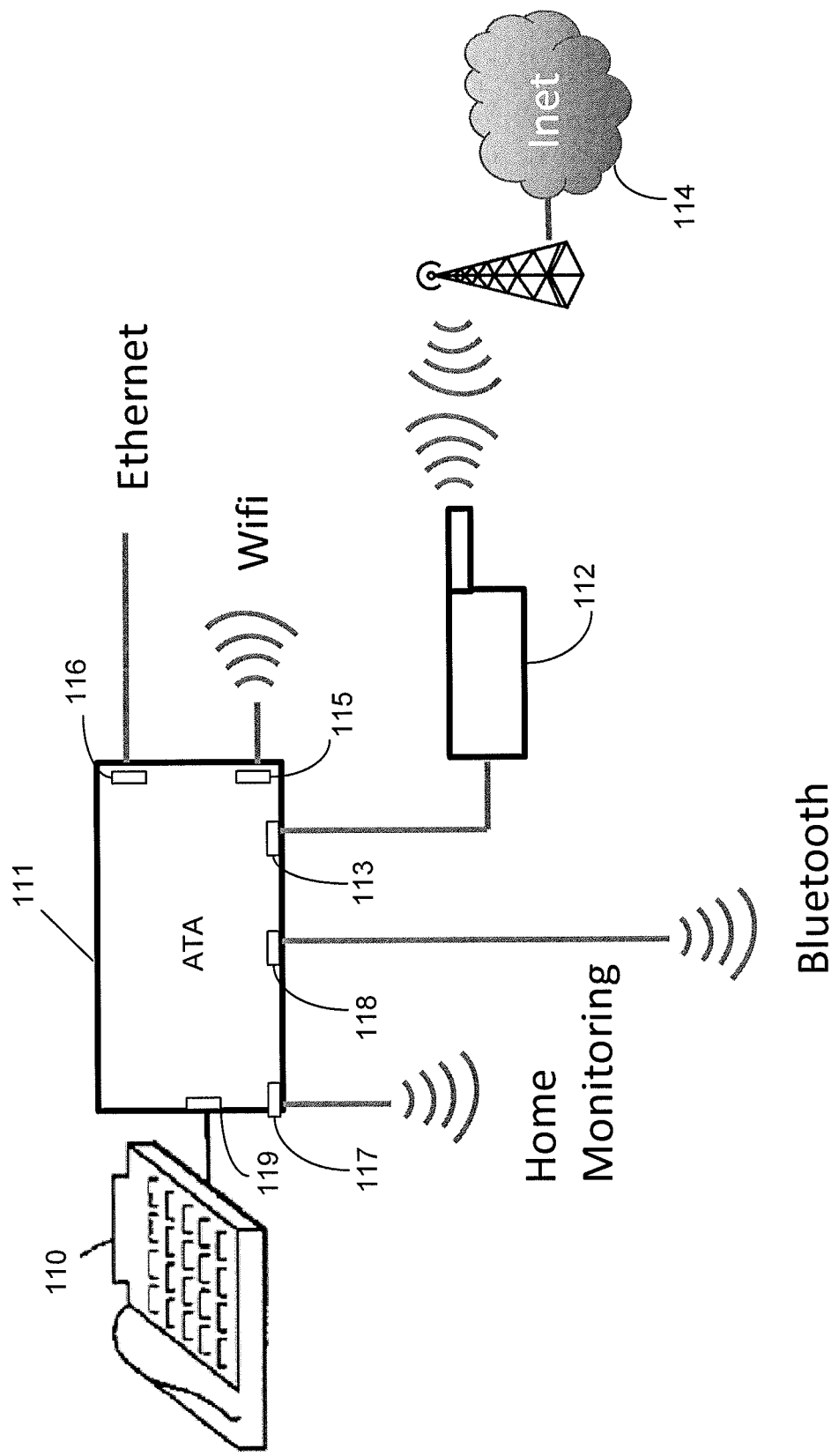
FIG. 13 shows a schematic diagram of the present invention having connectivity with a home monitoring system and Bluetooth connectivity.

Other embodiments of the system of the invention is shown in FIGS. 11-13.

Referring now to FIG. 11, the VoIP system that does not require a computer is shown that includes a basic analog telephone handset 90. The analog telephone handset 90 is connected to the ATA 91 through the ATA's 91 telephone port (RJ 11 or compatible) 96. The ATA 61 is shown connected to a cell phone 92. The connection may be through a USB cord that is plugged into one of the ATA's 91 USB ports. When configured in this manner, the ATA 91 can access the Internet 93 through the cell phone's 92 Internet connection. Generally, connection to the internet may be through a cell phone's 92 connection to the cell phone tower, whether the connection is of a GSM, CDMA, LTE, EVDO, or other standard, that the cell phone is able to obtain access to the Internet. However, the ATA 91 can also access the Internet through the cell phone 92 if the cell phone is connecting to the Internet through an available Wi-Fi or WIMAX signal. Alternatively, the cell phone function may be built into the ATA 91 as shown in FIG. 10. In addition, the ATA may connect to the Internet through the ATA's WiFi adapter 94 or Ethernet port 95.

Referring now to FIG. 12, the VoIP system that does not require a computer is shown that includes a basic analog telephone handset 100. The analog telephone handset 100 is connected to the ATA 101 through the ATA's 101 telephone port (RJ 11 or compatible) 108. The ATA 101 is shown connected to a cell phone 102. The connection may be through a USB cord that is plugged into one of the ATA's 101 USB ports 103. When configured in this manner, the ATA 101 can access the Internet 104 through the cell phone's 102 Internet connection. Generally, connection to the Internet may be through a cell phone's 102 connection to the cell phone tower, whether the connection is of a GSM, CDMA, LTE, EVDO or other standard, that the cell phone is able to obtain access to the Internet. However, the ATA 101 can also access the Internet through the cell phone 102 if the cell phone is connecting to the Internet through an available Wi-Fi or WIMAX signal. Alternatively, the cell phone function may be built into the ATA 101 as shown in FIG. 10. In addition, the ATA may connect to the Internet through the ATA's USB port 103, WiFi adapter 105 or Ethernet port 106.

The ATA may then interface with a home automation sensor, actuator or network, all of which are "home automation network" hereafter, via a wireless interface port 107. The connection to the home automation network may be a 433 MHz or equivalent network, Digital European Cordless Telecommunications (DECT) system, Zigbee or Z-Wave system or other wireless interface to connect with a home automation network, including thermostats or other climate control devices, lighting, or alarm systems. Other elements to a home automation network include two-way cameras, two way voice communication, climate control access and adjustment, including HVAC equipment and fans, alarm setup and monitoring for conditions such as smoke, fire, access violations, perimeter monitoring, motion sensors, remote door commands, and fire suppression system control. In addition, the ATA may work with the home automation network to coordinate scheduled events such as preset lighting and temperature control. The ATA may work with the home automation network to use event triggered macros, such as adding lighting at night when motion occurs in a room, or setting temperature when an alarm has been armed.

The ATA also supports existing Ethernet, USB, and Wifi interfaces to connect the elements of the home automation network with these interfaces. "Home automation network" also includes sensors, actuators and systems for one or more homes, vehicles, business establishments, and the like, in multiples or in combinations.

The Internet connection may be through a USB cord that is plugged into one of the ATA's 101 USB ports 103. When configured in this manner, the ATA 101 can access the Internet 104 through the cell phone's 102 Internet connection. Generally, connection to the internet may be through a cell phone's 102 connection to the cell phone tower, whether the connection is of a GSM, CDMA, LTE, EVDO, or other standard, that the cell phone is able to obtain access to the Internet. However, the ATA 101 can also access the Internet through the cell phone 102 if the cell phone 102 is connecting to the Internet 104 through an available Wi-Fi or WIMAX signal. Alternatively, the cell phone function may be built into the ATA 101 as shown in FIG. 10. In addition, the ATA 101 may connect to the Internet 104 through the ATA's USB 103, Wifi adapter 105 or Ethernet port 106.

Referring now to FIG. 13, another embodiment of a VoIP system that does not require a computer is shown that includes a basic analog telephone handset 110. The analog telephone handset 110 is connected to the ATA 111 through the ATA's 111 telephone port (RJ 11 or compatible) 119. The ATA 111 is shown connected to a cell phone 112. The connection may be through a USB cord that is plugged into one of the ATA's 111 USB ports 113. When configured in this manner, the ATA 111 can access the Internet 114 through the cell phone's 112 Internet connection. Generally, connection to the Internet may be through a cell phone's 102 connection to the cell phone tower, whether the connection is of a GSM, CDMA, LTE, EVDO, or other standard, that the cell phone is able to obtain access to the Internet. However, the ATA 111 can also access the Internet through the cell phone 112 if the cell phone is connecting to the Internet through an available Wi-Fi or WIMAX signal. In addition, the ATA may connect to the Internet through the ATA's USB port 113, WiFi adapter 115 or Ethernet port 116.

The ATA may then interface with a home automation network 117 as described above. The ATA 111 may also have a Bluetooth interface 118. The Bluetooth interface 118 may allow for connection to headsets. In addition, a Bluetooth connection may be made to a telephone handset using CELLLiNK™ or similar technology. With a connection to a Bluetooth handset, the system provides a telephonic connection.

While several connections are described herein, the various permutations of all of the elements of connectivity and communication are also contemplated herein.

The instant invention has been shown and described herein in what is considered to be the most practical and preferred embodiment. It is recognized, however, that departures may be made therefrom within the scope of the invention and that obvious modifications will occur to a person skilled in the art.

The invention claimed is:

1. A Voice over Internet Protocol (VoIP) telephone system that enables VoIP telephony and facsimile services allowing a user to gain access to telephone connectivity between an analog handset and the Internet, the system comprising:
 a first independent network relay (INR) including
  an electronic device with a USB connection,
  a first modem connected to the electronic device, and
  the first modem connected to the internet; and
 a second INR including
  an Ethernet cord,
  a router connected directly or indirectly to the Ethernet cord, and
  the router connected to the Internet;
 an analog telephone adapter (ATA) comprising a rigid housing that contains
  a central processor,
  a non-transitory storage medium,
  a memory source, and
  a network interface card;
 the ATA housing including
  a USB port,
  an Ethernet port, and
  a telephone port;
 an analog telephone for transmitting and receiving sound signals, the analog telephone connected to the telephone port for transmission and receipt of electronic signals from the ATA;
 the ATA having
  a first configuration wherein the ATA communicates with the first INR through the USB port of the ATA connected to the USB connection of the first INR, and
  a second configuration wherein the ATA communicates with a second INR through the Ethernet port of the ATA connected to the Ethernet cord of the second INR, wherein
   each of the configurations is selectable by the user,
   the configuration selected by the user is automatically detected by the ATA without a computer connection, and
   the ATA auto-configures to utilize the INR of the user selected configuration;
wherein both the first INR and the second INR are configured to connect to a publicly switched telephone network (PSTN) through the internet such that the ATA can transmit and receive telephone calls from other telephone handsets without the analog telephone being directly wired to the PSTN; and
whereby the user of the analog telephone can call other telephone handset users over the internet using the first INR or the second INR using the ATA.

2. The system of claim 1, wherein
the router is connected to the internet via a device selected from a group consisting of the first modem and a second modem.

3. The system of claim 1, wherein
the first modem is wirelessly connected to the electronic device.

4. The system of claim 1, wherein
the electronic device is a computer that has been loaded with a driver from the ATA.

5. The system of claim 1, wherein
the electronic device includes
   a device processor,
   a device non-transitory storage medium, and
   a device network interface card configured to receive Internet Protocol signals.

6. The system of claim 1, wherein
both the first INR and the second INR are configured to connect to a VoIP computer network with an account web page for the user.

7. The system of claim 1, wherein
the USB port, the Ethernet port, and the telephone port are all located on a single end of the rigid housing.

8. The system of claim 1, wherein
the ATA receives electrical power through the USB port in both the second configuration and the first configuration.

9. The system of claim 8, further comprising
in the second configuration a USB electronic power plug is connected to the USB port.

10. A Voice over Internet Protocol (VoIP) telephone system that enables VoIP telephony and facsimile services allowing a user to gain access to telephone connectivity between an analog handset and the internet, the system comprising:
   an analog telephone adapter (ATA) comprising a rigid housing that contains
     a central processor,
     a non-transitory storage medium,
     a memory source, and
     a network interface card;
   the ATA housing including
     a USB port,
     an Ethernet port, and
     a telephone port;
   an analog telephone for transmitting and receiving sound signals, the analog telephone connected to the telephone port for transmission and receipt of electronic signals from the ATA;
   the ATA having
     a first configuration wherein the ATA accesses a first independent network relay (INR) through the USB port, and
     a second configuration wherein the ATA accesses a second INR through the Ethernet port,
   wherein
     each of the configurations is selectable by the user,
     the configuration selected by the user is automatically detected by the ATA without a computer connection, and
     the ATA auto-configures to access the INR of the user selected configuration;
   the first INR including
     an electronic device with a USB connection connected to USB port of the ATA,
     a first modem connected to the electronic device, and
     the first modem connected to the internet; and
   the second INR including
     an Ethernet cord connected to the Ethernet port of the ATA,
     a router connected directly or indirectly to the Ethernet cord, and
     the router connected to the internet; and
   both the first INR and the second INR are configured to connect to a PSTN through the internet such that the ATA can transmit and receive telephone calls from other telephone handsets without the analog telephone being wired directly to the PSTN.

11. The system of claim 10, wherein
in the first configuration the ATA receives electrical power through the USB port.

12. The system claim 11, wherein
the telephone port is an RJ11 port.

13. The system of claim 10, wherein
the telephone port, the USB port, and the Ethernet port are located on a single side of the rigid housing.

14. The system of claim 10, wherein
the router is connected to the internet via a device selected from a group consisting of the first modem and a second modem.

15. The system of claim 10, wherein
the ATA receives and transmits Internet Protocol data through the USB port in the first configuration, and
the ATA receives and transmits Internet Protocol data through the Ethernet port in the second configuration.

16. The system of claim 10, wherein
the ATA is configured to wirelessly receive an alert from a smoke detector, and
the non-transitory storage medium of the ATA includes instructions for an event triggered macro in response to receiving the alert from the smoke detector.

17. A Voice over Internet Protocol (VoIP) telephone system that enables VoIP telephony services allowing a user to gain access to telephone connectivity between an analog handset and the internet, the system comprising:
   an analog telephone adapter (ATA) comprising a rigid housing that contains
     a central processor,
     a non-transitory storage medium,
     a memory source, and
     a network interface card;
   the ATA housing including
     a USB port,
     an Ethernet port, and
     a telephone port;
   an analog telephone for transmitting and receiving sound signals, the analog telephone connected to the telephone port for transmission and receipt of electronic signals from the ATA;
   the ATA having
     a first configuration wherein the ATA accesses a first independent internet access connection (IIAC) through the USB port, and a second configuration wherein the ATA accesses a
second IIAC through the Ethernet port,
wherein
each of the configurations is selectable by the user,
the configuration selected by the user is automatically detected by the ATA without a computer connection, and
the ATA auto-configures to access the IIAC of the user selected configuration;
the first IIAC including
an electronic device with a USB connection connected to USB port of the ATA,
a first modem connected to the electronic device, and
the first modem connected to the internet; and
the second IIAC including
an Ethernet cord connected to the Ethernet port of the ATA,
a router connected directly or indirectly to the Ethernet cord, and
the router connected to the internet;
both the first IIAC and the second IIAC are configured to connect to a PSTN via the internet such that the ATA can transmit and receive telephone calls from other telephone handsets without the analog telephone being directly connected to the PSTN; and
whereby the user of the analog telephone can call other telephone handset users over the internet using the first IIAC or the second IIAC using the ATA.

\* \* \* \* \*